United States Patent
Anand

(10) Patent No.: US 11,470,469 B2
(45) Date of Patent: Oct. 11, 2022

(54) METHOD, APPARATUS, COMPUTER PROGRAM, AND COMPUTER READABLE MEDIUM FOR MANAGING SUBSCRIPTION PROFILE

(71) Applicant: Samsung Electronics Co., Ltd., Suwon-si (KR)

(72) Inventor: Satyajit Anand, Bihar (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/252,679

(22) PCT Filed: Jul. 23, 2019

(86) PCT No.: PCT/KR2019/009120
§ 371 (c)(1),
(2) Date: Dec. 15, 2020

(87) PCT Pub. No.: WO2020/022757
PCT Pub. Date: Jan. 30, 2020

(65) Prior Publication Data
US 2021/0227381 A1    Jul. 22, 2021

(30) Foreign Application Priority Data

Jul. 23, 2018  (IN) .............................. 201841027578
Jul. 18, 2019  (IN) .............................. 201841027578

(51) Int. Cl.
*H04W 48/16*    (2009.01)
*H04W 8/26*    (2009.01)
(Continued)

(52) U.S. Cl.
CPC ........... *H04W 8/265* (2013.01); *H04W 8/205* (2013.01); *H04W 48/16* (2013.01); *H04W 48/18* (2013.01); *H04W 88/06* (2013.01)

(58) Field of Classification Search
CPC ..... H04W 8/265; H04W 8/205; H04W 48/16; H04W 48/18; H04W 88/06; H04W 8/18
See application file for complete search history.

(56) References Cited

U.S. PATENT DOCUMENTS 10,687,182 B1 *  6/2020  Kavuri .................. H04W 76/14
2015/0304506 A1   10/2015  Zhu et al.
(Continued)

FOREIGN PATENT DOCUMENTS

KR    10-2017-0082122 A    7/2017
WO    2017/116097 A1    7/2017
WO    2018/076711 A1    5/2018

OTHER PUBLICATIONS

Supplementary European Search Report dated Apr. 20, 2021, in connection with European Patent Application No. 19841006.0, 8 pages.

(Continued)

*Primary Examiner* — Julio R Perez

(57) ABSTRACT

According to an embodiment, there is provided an electronic device including: a memory storing instructions; and at least one processor configured to execute the instructions to: receive information of a network operator from at least one server; identify data location information based on the information of network operator; transmit the data location information to the other electronic device for activating a subscription profile at the other electronic device to use a network provided by the network operator; and manage the subscription profile of the other electronic device at the electronic device based on a user input.

17 Claims, 16 Drawing Sheets

(51) Int. Cl.
*H04W 8/20* (2009.01)
*H04W 48/18* (2009.01)
*H04W 88/06* (2009.01)

(56) References Cited

U.S. PATENT DOCUMENTS

| | | |
|---|---|---|
| 2016/0020803 A1 | 1/2016 | Cha et al. |
| 2016/0330784 A1 | 11/2016 | Liu et al. |
| 2018/0077566 A1 | 3/2018 | Cha et al. |
| 2018/0103370 A1 | 4/2018 | Park et al. |
| 2018/0295731 A1* | 10/2018 | Burdoucci ............ H04M 1/185 |
| 2019/0020997 A1 | 1/2019 | Park |
| 2021/0014670 A1 | 1/2021 | Li et al. |
| 2021/0176533 A1* | 6/2021 | Beattie, Jr. ......... H04N 21/2668 |
| 2021/0373831 A1* | 12/2021 | Yu ........................ G06F 3/1285 |

OTHER PUBLICATIONS

Notification of Transmittal of the International Search Report and the Written Opinion of the International Searching Authority, or the Declaration dated Nov. 29, 2019 in connection with International Patent Application No. PCT/KR2019/009120, 12 pages.
Intellectual Property India, "Examination report under sections 12 & 13 of the Patents Act" dated Oct. 1, 2021, in connection with Indian Patent Application No. 201841027578, 5 pages.

\* cited by examiner

METHOD, APPARATUS, COMPUTER PROGRAM, AND COMPUTER READABLE MEDIUM FOR MANAGING SUBSCRIPTION PROFILE

CROSS-REFERENCE TO RELATED APPLICATIONS

This application is a 371 of International Application No. PCT/KR2019/009120 filed on Jul. 23, 2019, which claims priority to India Patent Application No. 201841027578 filed on Jul. 23, 2018 and India Patent Application No. 201841027578 filed on Jul. 18, 2019, the disclosures of which are herein incorporated by reference in their entirety.

BACKGROUND

1. Field

Embodiments relate to cellular technology and more specifically to a method and system for remotely providing embedded subscriber identity module (eSIM) profiles to a secondary electronic device through a primary electronic device in a multi-eSIM profile environment.

2. Description of Related Art

A universal integrated circuit card (UICC) is used in electronic devices to ensure the confidentiality and integrity of personal information such as ciphering key (Kc). Various applets are installed and used on the UICC according to network types. For example, a subscriber identity module (SIM) is used on the UICC with networks of a global system for mobile communications (GSM) or a universal SIM is used on the UICC with any type of networks. The SIM or USIM enables electronic devices to be recognized on a carrier network. An embedded SIM (eSIM), which is often called as an embedded UICC (eUICC), is soldered into an electronic device during manufacturing the electronic device and is activated over the air. On the contrary to UICC, eUICC is not fully controlled by one specific mobile network operator (MNO) since it is generally not physically removable from the electronic device and is not issued by MNO. Information such as eSIM profile for operations of the eUICC in the electronic device is provisioned remotely over the air into the eUICC, which is termed as remote SIM provisioning (RSP) process. Usage of the eUICC has extended to consumer electronic devices and wearable devices (e.g. smart watch) thanks to its small form factor and the remote provisioning support over the air.

A recent development in a global system for mobile communication association (GSMA) over eSIM allows the eUICC to contain multiple eSIM profiles together and activate a single eSIM profile at a time while other eSIM profiles are in an inactive or dormant state.

SUMMARY

According to an embodiment, there is provided an electronic device including: a memory storing instructions; and at least one processor configured to execute the instructions to: receive information of a network operator from at least one server; identify data location information based on the information of network operator; transmit the data location information to the other electronic device for activating a subscription profile at the other electronic device to use a network provided by the network operator; and manage the subscription profile of the other electronic device at the electronic device based on a user input.

BRIEF DESCRIPTION OF THE DRAWINGS

The above and other advantages of embodiments will be better understood from the following description with reference to the accompanying drawings, in which.

DETAILED DESCRIPTION

Figure 1:
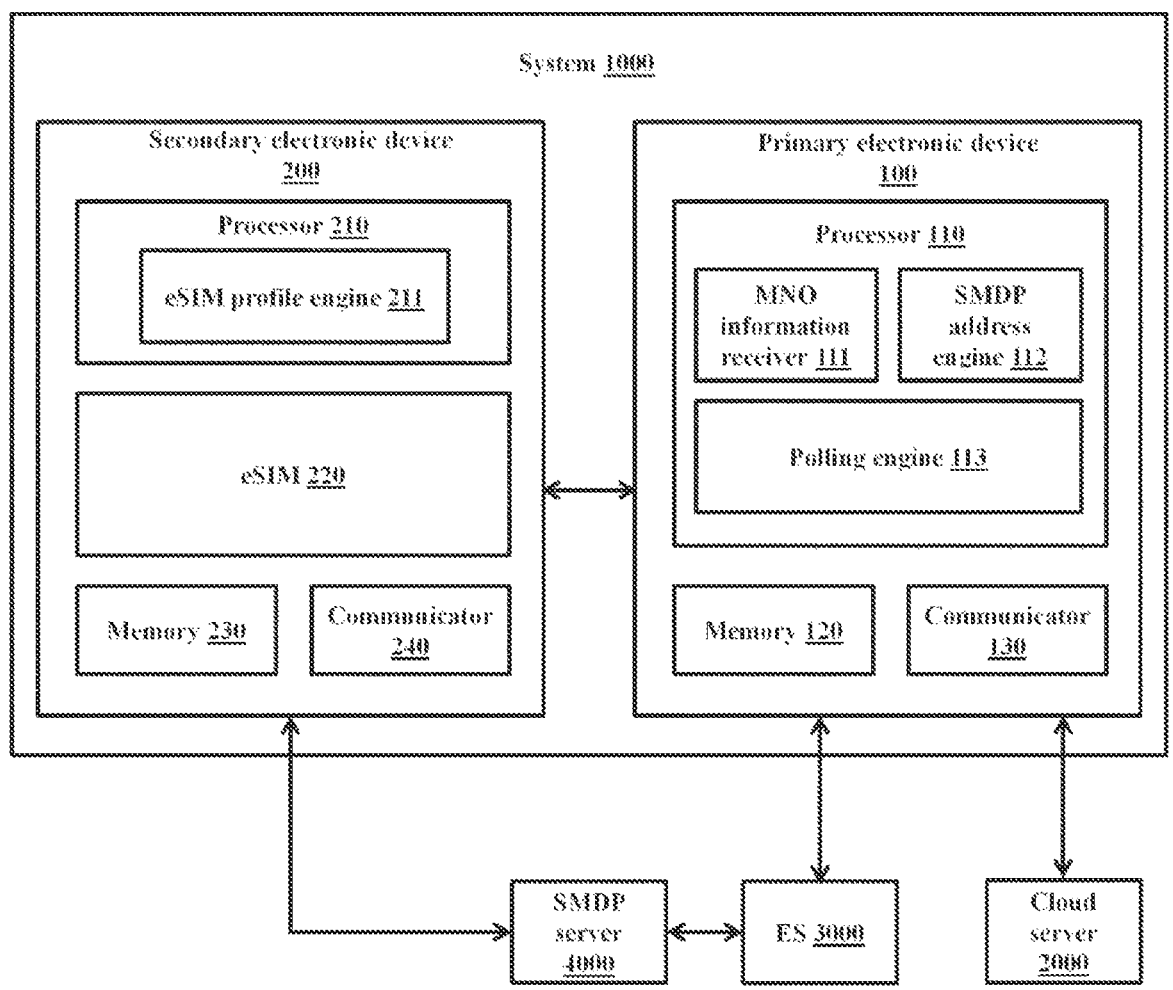
FIG. 1 is a block diagram of a system for remotely provisioning at least one eSIM profile through a primary electronic device for the secondary electronic device in a multi-eSIM profile environment, according to an embodiment.

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope and spirit of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

According to an embodiment, RSP of another eSIM profile may be facilitated when one eSIM profile already exists on the eUICC of the wearable devices, i.e. RSP may be available in multi-eSIM profile environment. According to an embodiment, Profile Policy Rule (PPR) may be handled based eSIM profile subscriptions in multi-eSIM profile environment. According to an embodiment, a customized RSP procedure satisfying operator specific needs may be provided in the multi-eSIM profile environment. In an example, the operator specific needs of a certain operator may be that the wearable devices should never have two eSIM profiles of the operator.

Users are allowed to use a one number service for the wearable devices, which basically means that the primary electronic device (like smart phone) and the wearable (i.e. a secondary electronic device) device (like watch) work independently but share the same Mobile Station International Subscriber Directory Number (MSISDN). Thus, both devices receive incoming call, and a device picking a call first takes up the control. A push messages may be transmitted to the wearable device from a push server for determining an activation of the eSIM profile and a status of the one number service after downloading the eSIM profile to the wearable devices. Certain MNOs do not have a push server to deliver the push messages. According to an embodiment, the activation of the eSIM profile and the status of the one number service status may be retrieved from the MNOs without using the push server.

Accordingly embodiments provide a method for remotely provisioning at least one eSIM profile through a primary electronic device in a multi-eSIM profile environment of a secondary electronic device. The method includes downloading, by the secondary electronic device, at least one eSIM profile from a subscription manager data preparation (SMDP) server. The method includes sending, by the primary electronic device, a request message to an ES for managing activation of the at least one eSIM profile in the secondary electronic device. The method includes receiving, by the primary electronic device, a response message from the ES, where the response message indicates a status over involved activation processes of the at least one eSIM profile in the secondary electronic device.

In an embodiment, the downloading, by the secondary electronic device, the at least one eSIM profile from the SMDP server includes receiving, by the primary electronic device, a MNO information from a cloud server, wherein the MNO information includes at least one of: an offline profile subscription capability, an On Device Activation (ODA) capability and a Quick Response (QR) support capability with at least one SMDP address and at least one ES address, determining, by the primary electronic device, the at least one SMDP address based on the MNO information, sending, by the primary electronic device, the at least one SMDP address to the secondary electronic device, and downloading, by the secondary electronic device, the at least one eSIM profile from the SMDP server based on the at least one SMDP address.

In an embodiment, the determining, by the primary electronic device, the at least one SMDP address based on the MNO information includes determining, by the primary electronic device, whether the offline profile subscription capability is available based on the MNO information, determining, by the primary electronic device, whether the at least one SMDP address is available at the cloud server, when the offline profile subscription capability is available, receiving, by the primary electronic device, the at least one SMDP address from the cloud server, when the at least one SMDP address is available at the cloud server, and receiving, by the primary electronic device, the at least one SMDP address based on the MNO information, when at least one of: the offline profile subscription capability is unavailable and the at least one SMDP address is unavailable.

In an embodiment, the receiving, by the primary electronic device, the at least one SMDP address based on the MNO information, when at least one of: the offline profile subscription capability is unavailable and the at least one SMDP address is unavailable includes determining, by the primary electronic device, whether the ODA capability is available based on the MNO information, receiving, by the primary electronic device, a download-info includes the at least one SMDP address of the at least one eSIM profile from the ES, when the ODA capability is available and an ODA subscription is completed, and determining, by the primary electronic device, the at least one SMDP address from the download-info.

In an embodiment, the receiving, by the primary electronic device, the at least one SMDP address based on the MNO information, when at least one of: the offline profile subscription capability is unavailable and the at least one SMDP address is unavailable includes determining, by the primary electronic device, whether the QR support capability is available based on the MNO information, and retrieving, by the primary electronic device, the at least one SMDP address includes additional downloading data information by scanning a QR code, when the QR support capability is available.

In an embodiment, the primary electronic device is registered to a push server to receive a message related to at least one eSIM profile service activation event.

In an embodiment, activating the at least one eSIM profile includes activating at least one service corresponding to eUICC of the secondary electronic device.

Accordingly embodiments provide a system for remotely provisioning at least one eSIM profile through a primary electronic device in a multi-eSIM profile environment of a secondary electronic device. The system includes the primary electronic device and the secondary electronic device. The secondary electronic device is configured to download the at least one eSIM profile from a SMDP server. The primary electronic device is configured to send a request message to an ES for managing activation of the at least one eSIM profile in the secondary electronic device. The primary electronic device is configured to receive a response message from the ES, wherein the response message indicates a status over involved activation processes of the at least one eSIM profile in the secondary electronic device.

In an embodiment, the downloading the at least one eSIM profile from the SMDP server includes sending a MNO information to the primary electronic device by a cloud server, wherein the MNO information includes at least one of: an offline profile subscription capability, an ODA capability and a QR support capability with at least one SMDP address and at least one ES address, receiving the at least one SMDP address from the primary electronic device, wherein the at least one SMDP address is determined by the primary electronic device based on the MNO information, and download the at least one eSIM profile from the SMDP server based on the at least one SMDP address.

According to an embodiment, the proposed method may allow the primary electronic device to initiate a polling service from the entitlement server (ES) for receiving push messages to the primary electronic device. The push messages may indicate an activation of the downloaded eSIM profile at the secondary electronic device and a status of a one number service. Therefore, the proposed method may be used to identify an activation status of the downloaded eSIM profile at the secondary electronic device and a status of the one number service from MNOs which does not have capability to support push servers.

Before downloading the eSIM profile by the secondary electronic device, the primary electronic device may extract profile policy rule (PPR) information from a metadata of the eSIM profile. The primary electronic device may handle the PPR information for enabling a disabled eSIM profile in the secondary electronic device and deleting at least one eSIM profile in the secondary electronic device.

The proposed method may allow the primary electronic device to perform remote provisioning of at least one eSIM profile for the secondary electronic device in a multi-SIM context.

According to an embodiment, the proposed method may allow the primary electronic device to perform customized RSP for the secondary electronic device based on operator specific rules.

According to an embodiment, multiples eSIM profiles of the secondary electronic device may be managed through the primary electronic device.

Referring now to the drawings, and more particularly to FIGS. 1 through 15, there are shown preferred embodiments.

FIG. 1 is a block diagram of a system for remotely provisioning at least one eSIM profile through a primary electronic device for a secondary electronic device in a multi-eSIM profile environment, according to an embodiment.

In an embodiment, the system may include the primary electronic device 100 and the secondary electronic device 200. In an embodiment, the primary electronic device 100 and the secondary electronic device 200 may be paired with each other by authentication.

The primary electronic device 100 may be, but not limited to a smart phone, a wearable device, a tablet computer, a personal computer, a personal digital assistance (PDA), or the like. The primary electronic device 100 may be connected to a cloud server 2000. The cloud server may be a look up server of a vendor of the primary electronic device 100. The primary electronic device 100 may be connected to an entitlement server (ES) 3000 of a mobile network operator (MNO). In an embodiment, the primary electronic device 100 may be connected to the cloud server 2000, the ES 3000 of the MNO and a push server. In an embodiment, the primary electronic device 100 may include a processor 110, a memory 120 and a communicator 130. The processor 110 is coupled to the memory 120 to perform corresponding operations to control the primary electronic device 100. FIG. 1 illustrates the processor 110 as including a MNO information receiver 111, a subscription manager data preparation (SMDP) address engine 112 and a polling engine 113, but the MNO information receiver 111, SMDP address engine 112, and polling engine 113 may refer to units which process at least one function or operation in the primary electronic device, and may be implemented by hardware, software, or a combination of hardware and software.

In an embodiment, the SMDP address engine 112 may process operations regarding user experience (UX). The SMDP address engine 112 may manage eSIM UX process flows of out-of-box experience for an offline profile subscription, a QR code-based profile subscription, and an on device activation (ODA)-based profile subscription. The SMDP address engine 112 may manage the eSIM UX process flows for a change in primary electronic device 100 and a change in SIM of the primary electronic device 100. The SMDP address engine 112 may manage UX interactions to handle the process of the eSIM UX. The SMDP address engine 112 may interact with the secondary electronic device 200.

The processor 110 is configured to execute instructions stored in the memory 120. The memory 120 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 may be configured to store larger amounts of information than the memory 120. In certain examples, a non-transitory storage medium may store data that can, over time, change (e.g., in Random Access Memory (RAM) or cache).

The communicator 130 may be configured to communicate internally between hardware components in the primary electronic device 100. The communicator 130 may be configured to facilitate communications with the secondary electronic device 200, the cloud server 2000, the ES 3000 and the push server.

Examples for the secondary electronic device 200 is, but not limited to a wearable device (e.g. smart watch, smart glass, smart band, etc.), a smartphone, a tablet computer, a personal computer, an Internet of Things (IoT) or the like. The secondary electronic device 200 may be connected to a subscription manager data preparation (SMDP) server 4000 of the MNO. In an embodiment, the secondary electronic device 200 may include a processor 210, a memory 230 and a communicator 240. The secondary electronic device 200 may include at least one eSIM. Each of the at least one eSIM 220 may have a eUICC identifier (EID). The processor 210 is coupled to the memory 230 to perform corresponding operations to control the secondary electronic device 200. FIG. 1 illustrates the processor 210 as including an eSIM profile engine 211, but the eSIM profile engine 211 may refer to units which process at least one function or operation in the secondary electronic device, and may be implemented by hardware, software, or a combination of hardware and software.

It should be understood that the primary electronic device and the secondary electronic device are distinguished based on their rules according to embodiments, and their names are merely for illustrative purpose in the disclosure, but not for limitation.

The processor 210 is configured to execute instructions stored in the memory 230. The memory 320 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In some examples, the memory 230 may be configured to store larger amounts of information than the memory 230. In certain examples, a non-transitory storage medium may store data that can, over time, change (e.g., in Random Access Memory (RAM) or cache).

The communicator 240 may be configured to communicate internally between hardware components in the secondary electronic device 100. The communicator 240 may be configured to facilitate communication with the primary electronic device 200 and the SMDP server 4000.

The processor 110 of the primary electronic device may be configured to receive MNO information from the cloud server 2000. The MNO information may include at least one of: information regarding offline profile subscription capability, information regarding ODA capability, information regarding QR support capability with at least one SMDP address, and information regarding at least one ES address. In an embodiment, the MNO information receiver 111 may receive the MNO information from the cloud server 2000.

The processor 110 may be configured to determine at least one SMDP address based on the MNO information. In an embodiment, the SMDP address engine 112 may determine the at least one SMDP address based on the MNO information.

In an embodiment, the processor 110 may be configured to determine whether offline profile subscription capability is available based on the MNO information. The processor 110 may be configured to determine whether the at least one SMDP address is available at the cloud server 2000, when the offline profile subscription capability is available. The processor 110 may be configured to receive the at least one SMDP address from the cloud server 2000, when the at least one SMDP address is available at the cloud server 2000. The processor 110 may be configured to receive the at least one SMDP address based on the MNO information, when the offline profile subscription capability is unavailable and/or the at least one SMDP address is unavailable.

In an embodiment, the processor 110 may be configured to determine whether ODA capability is available based on the MNO information, when the offline profile subscription capability is unavailable and/or the at least one SMDP address is unavailable. The processor 110 may be configured to receive additional information including the at least one SMDP address of the at least one eSIM profile from the ES 3000, when the ODA capability is available and an ODA subscription is completed.

In an embodiment, the processor 110 may be configured to determine whether the ES 3000 is available for the primary electronic device 100 and the primary electronic device 100 is eligible for performing the ODA subscription. The processor 110 may be configured to contact to the ES 3000 to complete the subscription for the EID of the secondary electronic device 200, when the ES 3000 is available for the primary electronic device 100. The processor 110 may be configured to complete the subscription for the EID of the secondary electronic device 200 through a MNO web portal, and the ES 3000 may forward the primary electronic device 100 to the MNO web portal. The ES 3000 may create the eSIM profile at the SMDP server 4000, when user successfully completes the subscription. The ES 3000 may send additional information including the SMDP address of the eSIM profile to the primary electronic device 100.

The processor 110 may be configured to determining the at least one SMDP address from the additional information.

In an embodiment, the processor 110 may be configured to determine whether QR support capability is available based on the MNO information, when the offline profile subscription capability is unavailable and/or the at least one SMDP address is unavailable. The processor 110 may be configured to retrieve the at least one SMDP address included in the additional information by scanning a QR code, when the QR support capability is available.

The processor 110 may be configured to send the at least one SMDP address to the secondary electronic device 200. In an embodiment, the SMDP address engine 112 may send the at least one SMDP address to the secondary electronic device 200. The processor 210 of the secondary electronic device may be configured to download the at least one eSIM profile from the SMDP server 4000 based on the at least one SMDP address. In an embodiment, the eSIM profile engine 211 of the secondary electronic device may download the at least one eSIM profile from the SMDP server 4000 based on the at least one SMDP address.

In an embodiment, the processor 210 of the secondary electronic device 200 may be configured to download the at least one eSIM profile from the SMDP server 4000 using the at least one SMDP address. In an embodiment, the eSIM profile engine 211 may download the at least one eSIM profile from the SMDP server 4000 using the at least one SMDP address.

In an embodiment, the processor 210 of the secondary electronic device 200 may be configured to install the eSIM profile to the eSIM 220, in response to downloading the eSIM profile by the secondary electronic device 200. In an embodiment, the eSIM profile engine 211 may install the eSIM profile to the eSIM 220, in response to downloading the eSIM profile by the secondary electronic device 200. The secondary electronic device 200 may notify the primary electronic device 100 that the eSIM profile has been downloaded at the secondary electronic device 200.

The processor 110 of the primary electronic device 100 may be configured to send a request message (e.g. HTTP request) to the ES 3000 for managing activation of the at least one eSIM profile in the secondary electronic device 200. In an embodiment, the processor 110 may be configured to initiate a polling service to determine an activation event of the at least one eSIM profile service along with a one number service status. The polling service may be conducted by calling 'acquireConfiguration' method over the ES 3000. A triggering time for polling may be set to a certain period of time, for example, every 30 sec, every 1 min, every 5 min, every 10 min, every 30 min, and the triggering time may continue for a certain period of time, for example, 6 hours, 24 hours, etc. In an embodiment, the polling engine 113 may send the request message to the ES 3000 for managing activation of the at least one eSIM profile in the secondary electronic device 200. In an embodiment, the primary electronic device 100 may be registered to the push server to receive a message related to activation event of at least one eSIM profile service.

The processor 110 may be configured to receive a response message (e.g. HTTP 200 OK) from the ES 3000. The response message may indicate a status over activation processes of the at least one eSIM profile in the secondary electronic device 200. In an embodiment, activation of the at least one eSIM profile may include activating at least one service corresponding to eUICC of the secondary electronic device 200. In an embodiment, the polling engine 113 may receive the response message from the ES 3000. The processor 110 may be configured to terminate the polling service, in response to receiving the response message. In an embodiment, the polling engine 113 may terminate the polling service, in response to receiving the response message.

In an embodiment, the primary electronic device 100 may perform authentication and check eligibility before interacting with the ES 3000. The authentication may be done through Extensible Authentication Protocol-Authentication and Key Agreement (EAP-AKA) means. In an embodiment the primary electronic device 100 may perform authentication using an openID Connect (through a web) authentication. The primary electronic device 100 may manage any possible abnormal/error scenarios during provisioning the eSIM profile.

The primary electronic device 100 may display available eSIM profiles and provides an option to manage/delete the eSIM profiles. SIM swapping (activating different eSIM profile) may be conducted on the fly by the primary electronic device 100.

Although the FIG. 1 shows components of the system 1000 but it is to be understood that embodiments are not limited thereon. In embodiments, the system 1000 may include less or more number of components. The labels or names of the components are used only for illustrative purpose and does not limit the scope of the invention. One or more components may be combined together to perform same or substantially similar function for remotely provisioning the at least one eSIM profile through the primary electronic device 100 for the secondary electronic device 200 in the multi-eSIM profile environment.

Figure 2:
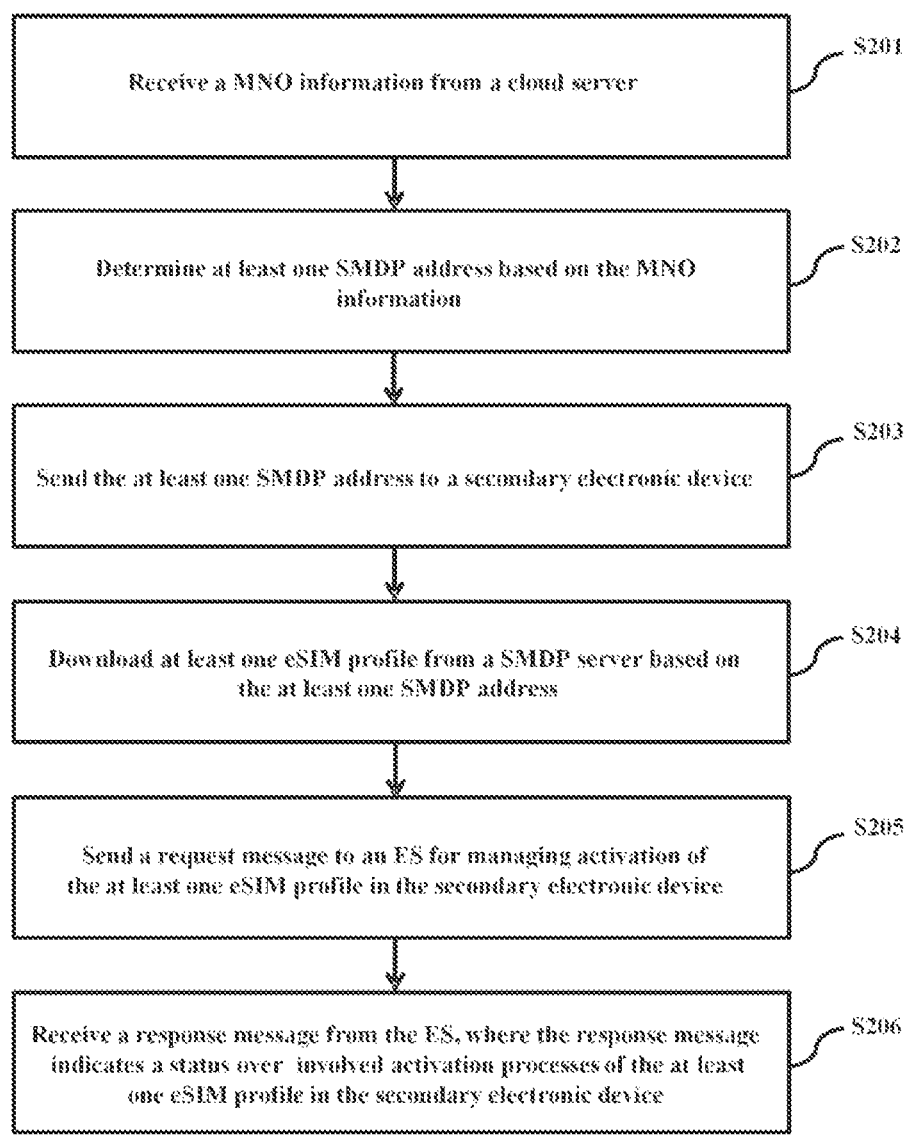
FIG. 2 is a flow diagram illustrating a method for remotely provisioning at least one eSIM profile through a primary electronic device for a secondary electronic device in multi-eSIM profile environment, according to an embodiment.

FIG. 2 is a flow diagram illustrating a method for remotely provisioning at least one eSIM profile through a primary electronic device for a secondary electronic device in the multi-eSIM profile environment, according to an embodiment.

At S201, the MNO information may be received at the primary electronic device 100 from the cloud server 2000. The MNO information may include at least one of: the information of the offline profile subscription capability, the information of the ODA capability, the information of the QR support capability with the at least one SMDP address and the information of the at least one ES address. In an embodiment, the method may allow the MNO information receiver 111 to receive the MNO information from the cloud server 2000.

At S202, the at least one SMDP address may be determined at the primary electronic device 100 based on the MNO information. In an embodiment, the method may allow the SMDP address engine 112 to determine the at least one SMDP address based on the MNO information. At S203, the at least one SMDP address may be sent from the primary electronic device 100 to the secondary electronic device 200. In an embodiment, the method may allow the SMDP address engine 112 to send the at least one SMDP address to the secondary electronic device 200. At S204, the at least one eSIM profile may be downloaded at the secondary electronic device 200 from the SMDP server 4000 based on the at least one SMDP address. In an embodiment, the method may allow the eSIM profile engine 211 of the secondary electronic device 200 to download the at least one eSIM profile from the SMDP server 4000 based on the at least one SMDP address.

At S205, the request message may be sent from the primary electronic device 100 to the ES 3000 for managing activation of the at least one eSIM profile in the secondary electronic device 200. In an embodiment, the method may allow the polling engine 113 to send the request message to the ES 3000 for managing activation of the at least one eSIM profile in the secondary electronic device 200. At S206, the response message may be received at the primary electronic device 100 from the ES 3000. The response message may indicate status over activation processes of the at least one eSIM profile in the secondary electronic device 200. In an embodiment, the method may allow the polling engine 113 to receive the response message from the ES 3000.

In an embodiment, the primary electronic device 100 is a smart phone 100, and the secondary electronic device 200 is a smart watch 200.

Figure 3:
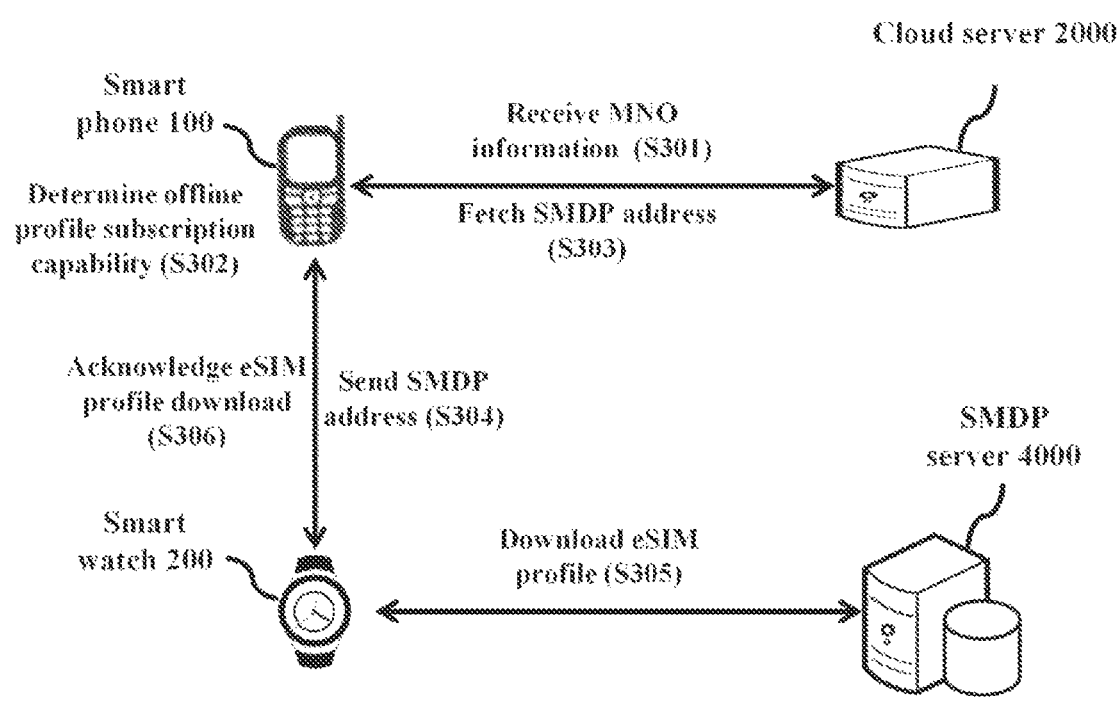
FIG. 3 illustrates an example scenario of downloading an eSIM profile by a smart watch based on offline profile subscription capability of an MNO, according to an embodiment.

FIG. 3 illustrates an example scenario of downloading an eSIM profile by a smart watch based on offline profile subscription capability of an MNO, according to an embodiment.

Offline subscription may be done in a shop for an EID of the smart watch 200. Accordingly, the eSIM profile for the EID of the smart watch 200 may be created at the SMDP server 4000 of the MNO. The cloud server 2000 may store the SMDP address of the eSIM profile for the EID of the smart watch 200. The smartphone 100 may be paired to the smart watch 200. The smartphone 100 may be connected to the cloud server 2000. The smart watch 200 may be connected to the SMDP server 4000.

At S301, the smartphone 100 may receive the MNO information including information of offline profile subscription capability from the cloud server 2000. At S302, the smartphone 100 may determine that the MNO have the offline profile subscription capability based on the MNO information. At S303, the smartphone 100 may contact to the cloud server 2000 and fetch an SMDP address, in response to determining that the MNO has the offline profile subscription capability. At S304, the smartphone 100 may send the SMDP address to the smart watch 200. At S305, the smart watch 200 may contact to the SMDP server 4000 based on the SMDP address and download the eSIM profile. In response to downloading the eSIM profile, at S306, the smart watch 200 may notify the smartphone 100 that the eSIM profile has been successfully downloaded from the SMDP server 4000.

Figure 4:
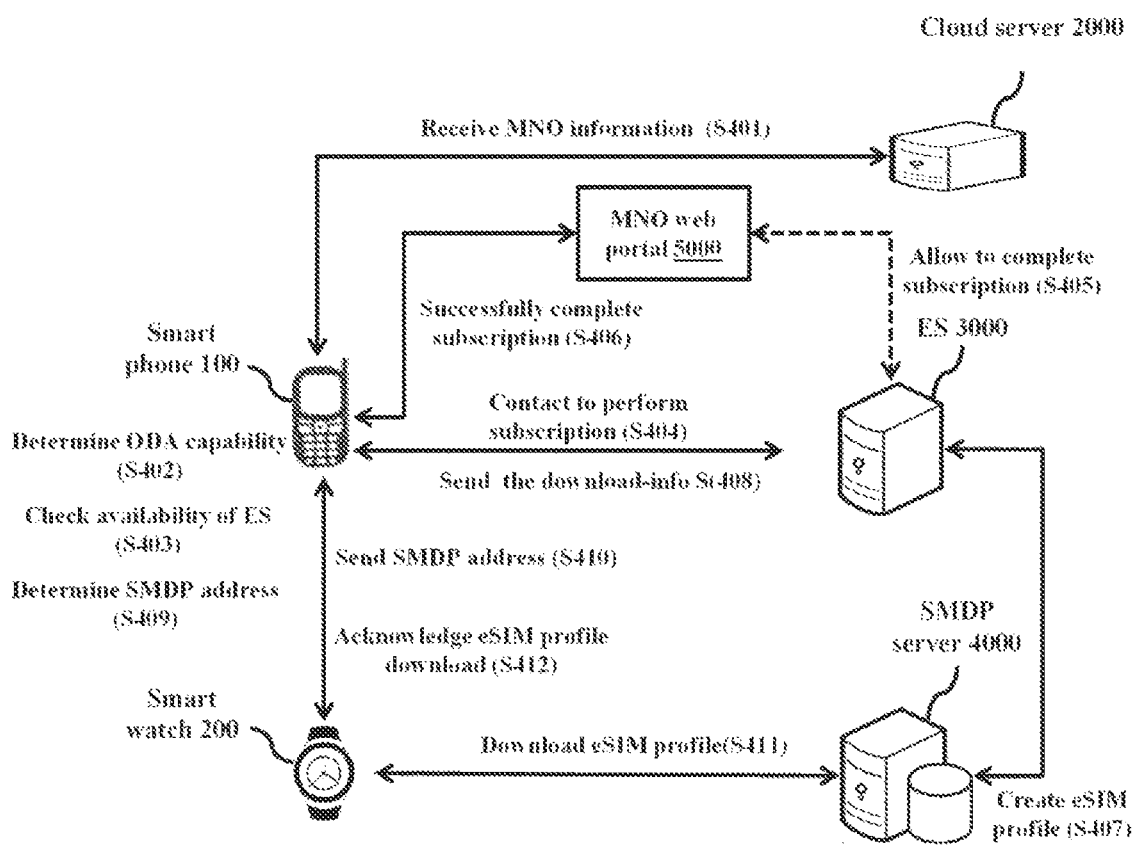
FIG. 4 illustrates an example scenario of downloading an eSIM profile by a smart watch based on ODA capability of an MNO, according to an embodiment.

FIG. 4 illustrates an example scenario of downloading an eSIM profile by a smart watch based on ODA capability of an MNO, according to an embodiment.

It is assumed that the smartphone 100 is paired to the smart watch 200, the smartphone 100 is connected to the cloud server 2000 and the ES 3000, the smart watch 200 is connected to the SMDP server 4000, and the ES 3000 is connected to the SMDP server 4000. However, such assumption may vary according to embodiments.

At S401, the smartphone 100 may receive MNO information including information of ODA capability from the cloud server 2000. At S402, the smartphone 100 may determines that an MNO has the ODA capability based on the MNO information. In response to determining that the MNO has the ODA capability, at S403, the smartphone 100 may check whether the ES 3000 is available for the smartphone 100 for performing subscription. At S404, the smartphone 100 may contact to the ES 3000 to perform subscription for the EID of the smart watch 200, when the ES 3000 is available for the smartphone 100. At S405, the ES 3000 may allow the smartphone 100 to complete the subscription for the EID of the smart watch 200 through an MNO web portal 5000. At S406 the smartphone 100 may complete the subscription for and EID of the smart watch 200 through the MNO web portal 5000. At S407, the ES 3000 may create an eSIM profile at the SMDP server 4000, when the subscription is completed. At S408, the ES 3000 may send information of an SMDP address of the eSIM profile to the smartphone 100. The information may be referred to as download-info. At S409, the smartphone 100 may determine the SMDP address of the eSIM profile from the information of the SMDP address.

At 410, the smartphone 100 may send the SMDP address to the smart watch 200. At S411, the smart watch 200 may contact to the SMDP server 4000 based on the SMDP address and download the eSIM profile. In response to downloading the eSIM profile, at S412, the smart watch 200 may notify the smartphone 100 that the eSIM profile has been successfully downloaded from the SMDP server 4000.

Figure 5:
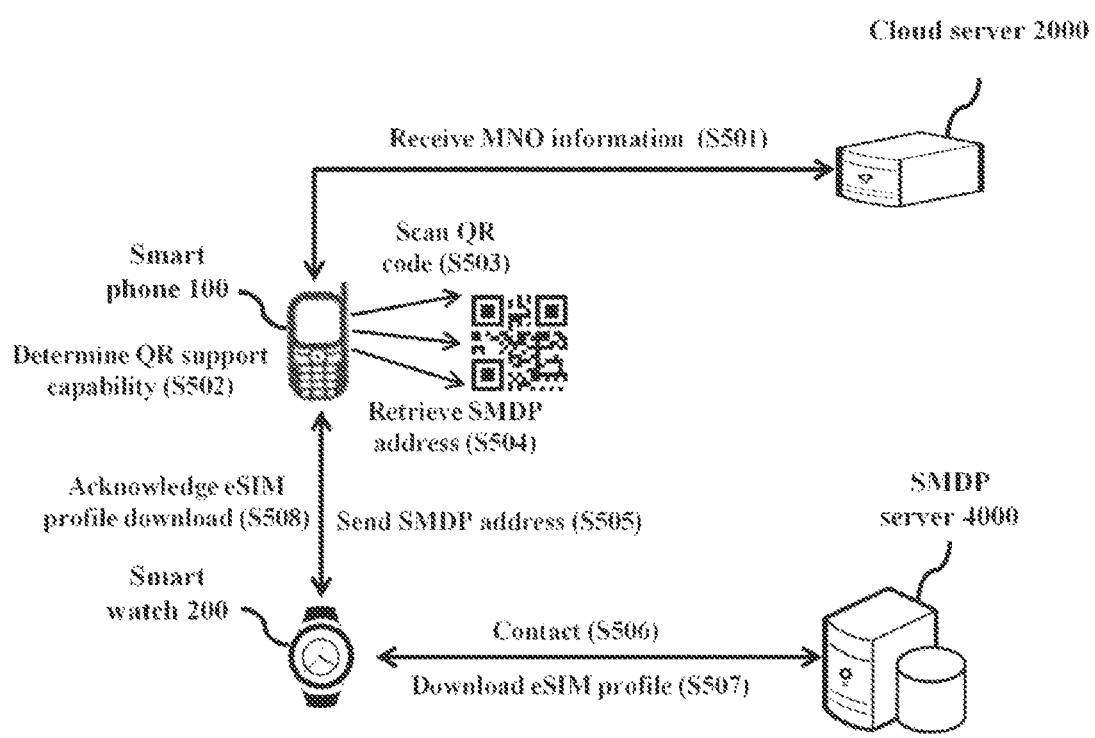
FIG. 5 illustrates an example scenario of downloading an eSIM profile by a smart watch based on QR code support capability of an MNO, according to an embodiment.

FIG. 5 illustrates an example scenario of downloading an eSIM profile by a smart watch based on QR code support capability of an MNO, according to an embodiment.

It is assumed that the smartphone 100 is paired to the smart watch 200, the smartphone 100 is connected to the cloud server 2000, and the smart watch 200 is connected to the SMDP server 4000. However, such assumption may vary according to embodiments.

At S501, the smartphone 100 may receive the MNO information including information of QR support capability from the cloud server 2000. At S502, the smartphone 100 may determine that an MNO has the QR support capability based on the MNO information.

At S503, a QR code may be captured at the smartphone 100 for scanning, and the smartphone 100 may scan the QR code, and retrieve the SMDP address from the QR code at S504. The SMDP address may include additional information in addition to an address. At S505, the smartphone 100 may send the SMDP address to the smart watch 200. At S506, the smart watch 200 may contact to the SMDP server 4000 based on the SMDP address. At S507, the smart watch 200 may download an eSIM profile for an EID of the smart watch 200 from the SMDP server 4000 using the additional downloading data. In response to downloading the eSIM profile, at S508, the smart watch 200 may notify the smartphone 100 that the eSIM profile has been successfully downloaded from the SMDP server 4000.

Figure 6:
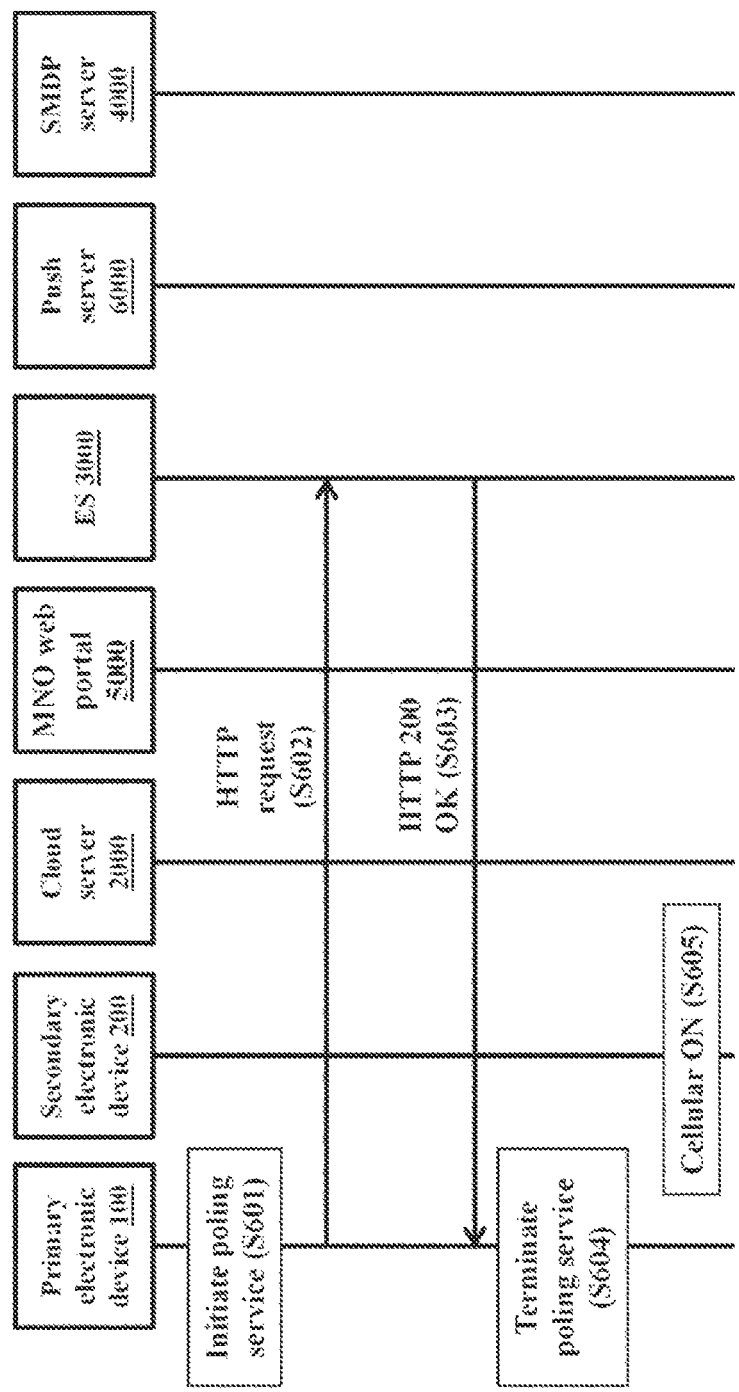
FIG. 6 is a sequential diagram illustrating steps in determining an activation of an eSIM profile and a status of a one number service by enabling a polling service at a primary electronic device, according to an embodiment.

FIG. 6 is a sequential diagram illustrating steps in determining activation of an eSIM profile and a status of one number service by enabling a polling service at a primary electronic device, according to an embodiment.

After downloading an eSIM profile by the secondary electronic device 200, at S601, the primary electronic device 100 may initiate a polling service to find eSIM profile service activation status along with one number service status. The polling service may be conducted by calling 'acquireConfiguration' method over the ES 3000. At S602, the primary electronic device 100 may send a "HTTP request" message to the ES 3000 for finding activation status of the eSIM profile at the secondary electronic device 200 along with the one number status. The ES 3000 may activate a service for the eSIM profile along with the one number service for the secondary electronic device 200. In response to detecting that the eSIM profile at the secondary electronic device 200 is activated (i.e. cellular ON), the ES 3000 may send a response message such as "HTTP 200 OK" to the primary electronic device 100. At S604, the primary electronic device 100 may terminate the polling service. The primary electronic device 100 indicates the activation of the eSIM profile service along with the one number service to the secondary electronic device 200. At S605, the secondary electronic device 200 may initiate a service using the eSIM profile along with the one number service.

Figure 7:
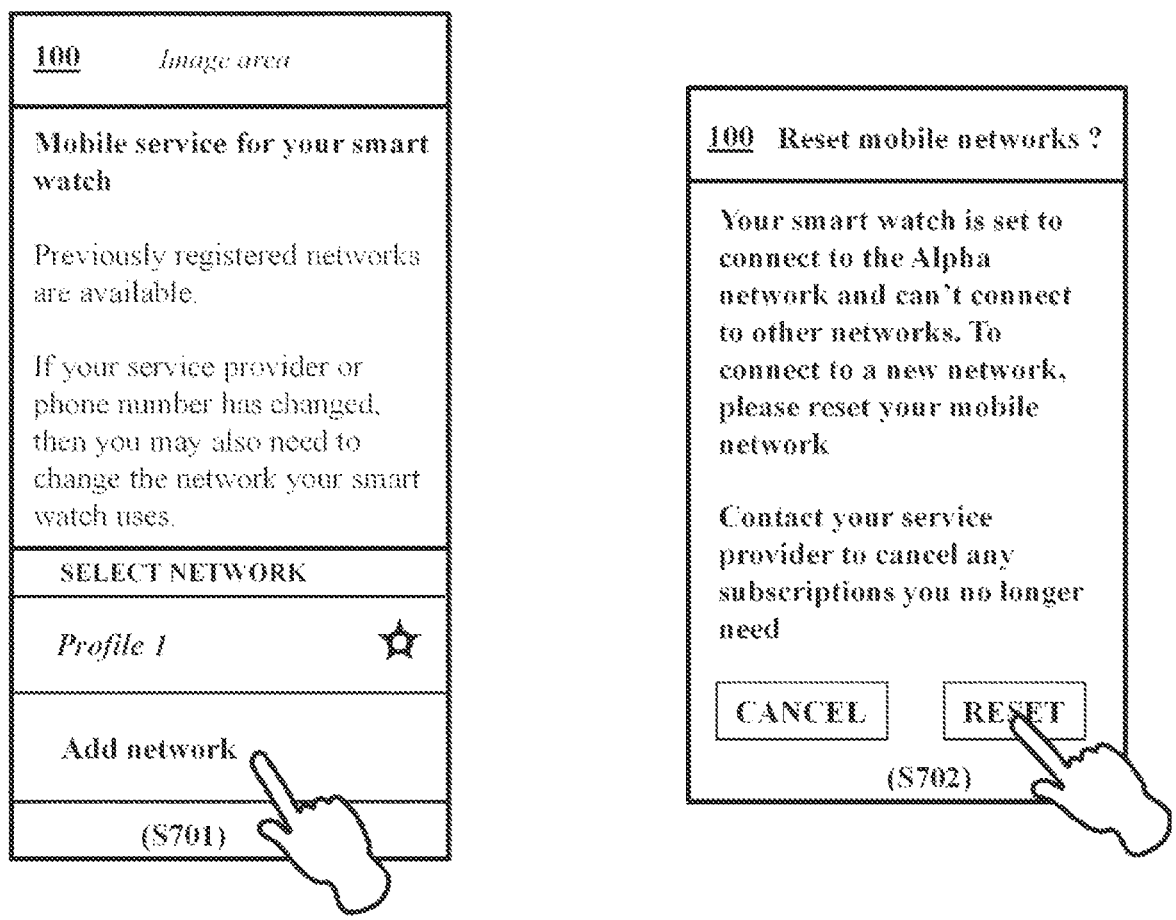
FIG. 7 illustrates an example scenario of adding a new subscription for a smart watch by a smartphone, according to an embodiment.

FIG. 7 illustrates an example scenario of adding a new subscription for a smart watch by a smartphone, according to an embodiment.

It is assumed that the smartphone 100 is paired to the smart watch 200, the smart watch 200 has a single eSIM profile, and the single eSIM profile is enabled by the smartphone 100 for the smart watch 200. However, such assumption may vary according to embodiments.

At S701, an option to add a new network (i.e. subscription) for the smart watch 200 may be selected using the smartphone 100. At S702, the smartphone 100 may provides an option to a user for accepting or discarding resetting of a mobile network of the smart watch 200. In response to accepting the resetting of the mobile network by the user, the smartphone 100 may reset the mobile network and searches for available networks. The smartphone 100 may provide the available networks for the smart watch 200.

Figure 8:
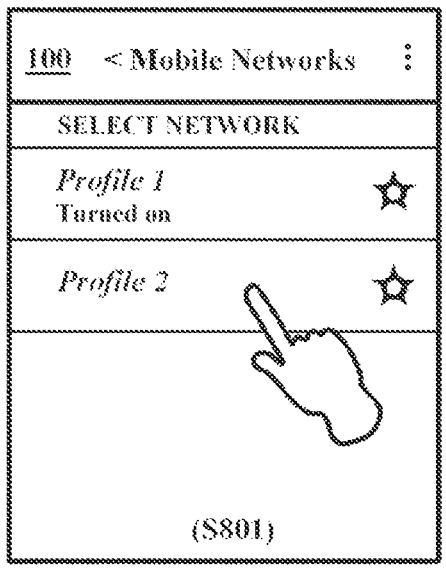
FIG. 8 illustrates an example scenario of enabling a second eSIM profile for a smart watch by a smartphone, according to an embodiment.
Figure 8:
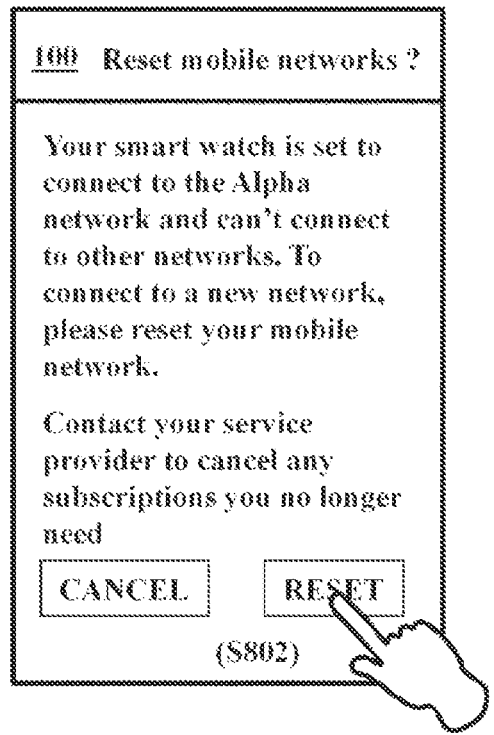

FIG. 8 illustrates an example scenario of enabling a second eSIM profile for a smart watch 200 by a smartphone 100, according to an embodiment.

It is assumed that the smartphone 100 is paired to the smart watch 200, the smart watch 200 has two eSIM profiles, and a first eSIM profile "Profile 1" is enabled by the smartphone 100 for the smart watch 200. However, such assumption may vary according to embodiments.

At S801, a second eSIM profile "Profile-2" may be selected using the smartphone 100, to enable the second eSIM profile for the smart watch 200. At S802, the smartphone 100 may provide an option for accepting or discarding resetting of a mobile network of the smart watch 200. In response to accepting the resetting of the mobile network by the user, the smartphone 100 may reset the mobile network, disable the first profile for the smart watch 200, and enable the second eSIM profile for the smart watch 200.

Figure 9:
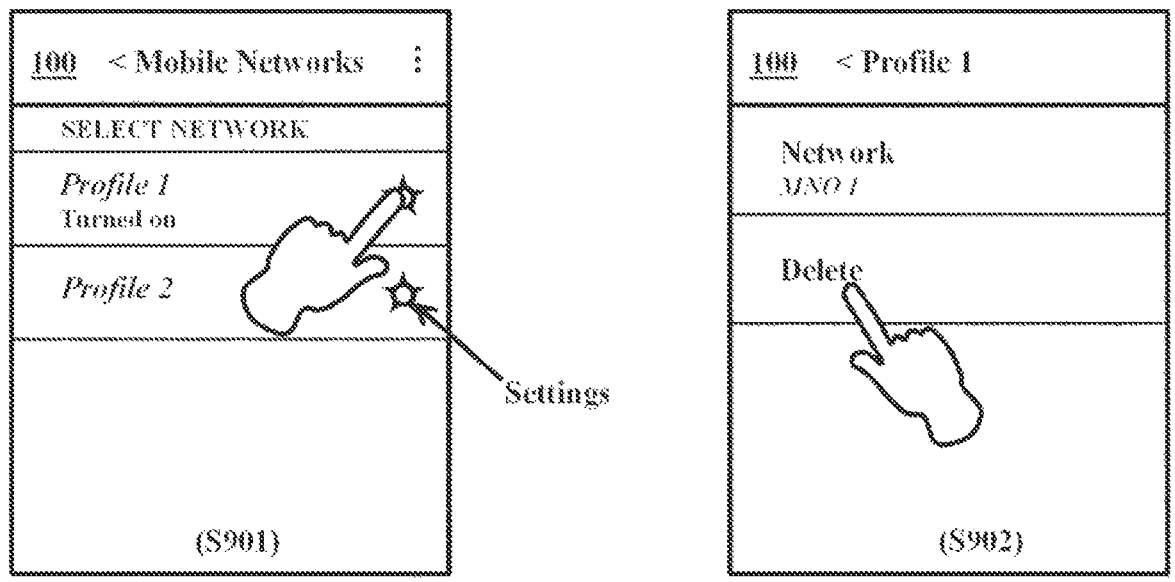
FIG. 9 illustrates an example scenario of deleting an enabled eSIM profile in a smart watch by a smartphone, according to an embodiment.
Figure 9:
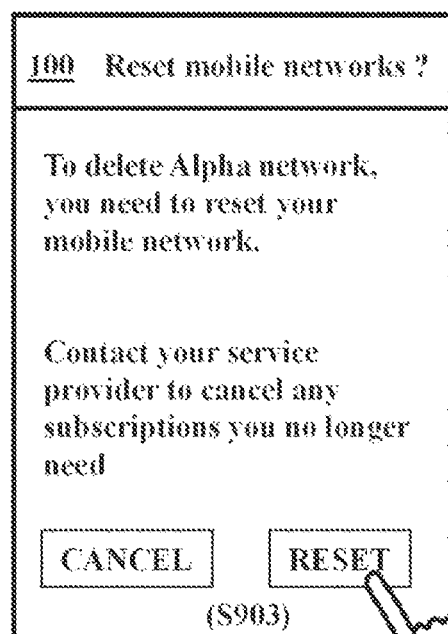

FIG. 9 illustrates an example scenario of deleting an enabled eSIM profile in a smart watch 200 by a smartphone 100, according to an embodiment.

It is assumed that the smartphone 100 is paired to the smart watch 200, the smart watch 200 has two eSIM profiles, and a first eSIM profile "Profile 1" is enabled by the smartphone 100 for the smart watch 200. However, such assumption may vary according to embodiments.

At S901, a settings option of a second eSIM profile may be selected using the smartphone 100. At S902, the smartphone 100 may provide setting options of the first eSIM profile. The setting options may include showing a network details and a delete option. When the delete option to delete the first eSIM profile is selected, the smartphone 100 may provide an option for accepting or discarding the resetting of the mobile network at S903. In response to accepting the resetting of the mobile network by the user, the smartphone 100 may configure the smart watch 200 to delete the first eSIM profile.

Figure 10:
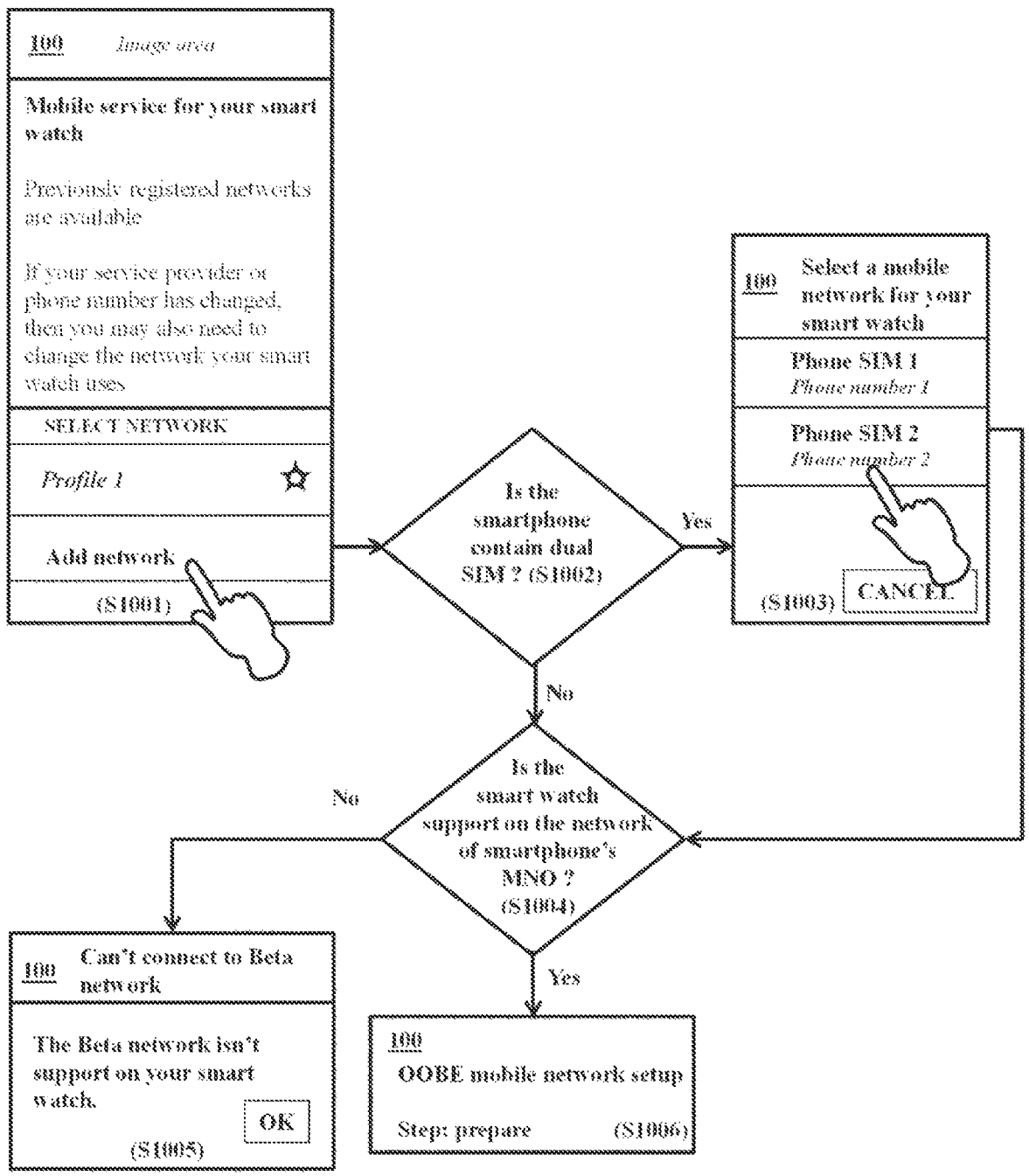
FIG. 10 illustrates an example scenario of remotely provisioning an eSIM profile by a dual SIM smartphone, according to an embodiment.

FIG. 10 illustrates an example scenario of remotely provisioning an eSIM profile by a dual SIM smartphone, according to an embodiment.

It is assumed that the smartphone 100 is paired to the smart watch 200, the smartphone 100 is a dual SIM smartphone, the smart watch 200 has an eSIM profile "Profile 1", and the eSIM profile is enabled by the smartphone 100 for the smart watch 200. However, such assumption may vary according to embodiments.

At S1001, an option to add a new network for the smart watch 200 may be selected using the smartphone 100. At S1002, the smartphone 100 may determine whether the smartphone 100 has a two or more SIMS.

At S1003, the smartphone 100 may provide an option for selecting a mobile network for the smart watch 200, and the option may include a primary SIM (i.e. Phone SIM 1) and a secondary SIM (i.e. Phone SIM 1), when the smartphone 100 has two or more SIMS. When the secondary SIM is selected in the smartphone 100 for selecting the mobile network corresponding to the secondary SIM for the smart watch 200, at S1004, the smartphone 100 may determine whether the smart watch 200 supports the mobile network corresponding to the secondary SIM of the smartphone 100. At S1005, the smartphone 100 may notify a user that the smart watch 200 is unable to connect to the mobile network corresponding to the secondary SIM, when the smart watch 200 does not support the network corresponding to the secondary SIM of the smartphone 100. At S1006, the smartphone 100 may notify a user that the smart watch 200 initiates connection to the mobile network corresponding to the secondary SIM of the smartphone 100, when the smart watch 200 supports the mobile corresponding to the secondary SIM of the smartphone 100.

If it is determined the smartphone does not have two or more SIMS at S1002, the smartphone 100 may determine whether the smart watch 200 supports a network corresponding to a single SIM of the smartphone 100. At S1005, the smartphone 100 may notify a user that the smart watch 200 is unable to connect to the mobile network corresponding to the single SIM of the smartphone 100, when the smart watch 200 does not support on the network corresponding to the single SIM of the smartphone 100. The smartphone 100 may notify the user that the smart watch 200 is initiates connection to the mobile network corresponding to the single SIM of the smartphone 100, when the smart watch 200 supports the network used in the smartphone 100.

According to an embodiment, the proposed method may allow the primary electronic device 100 to perform remotely provisioning of the at least one eSIM profile for the secondary electronic device 200 in the multi-SIM context.

Figure 11A:
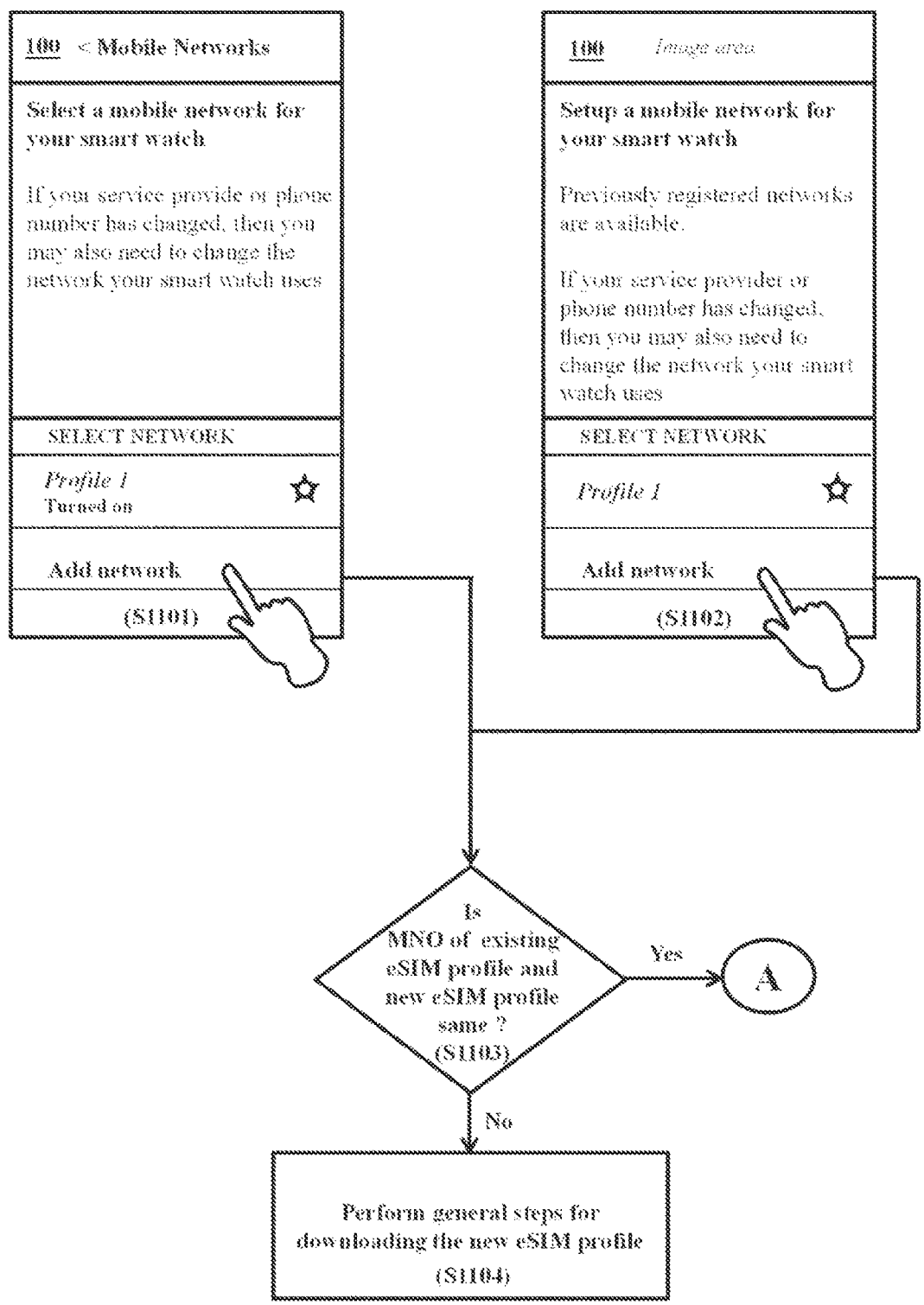
FIG. 11a and FIG. 11b illustrate an example scenario of performing a customized RSP for a smart watch based on operator specific rules, according to an embodiment.
Figure 11B:
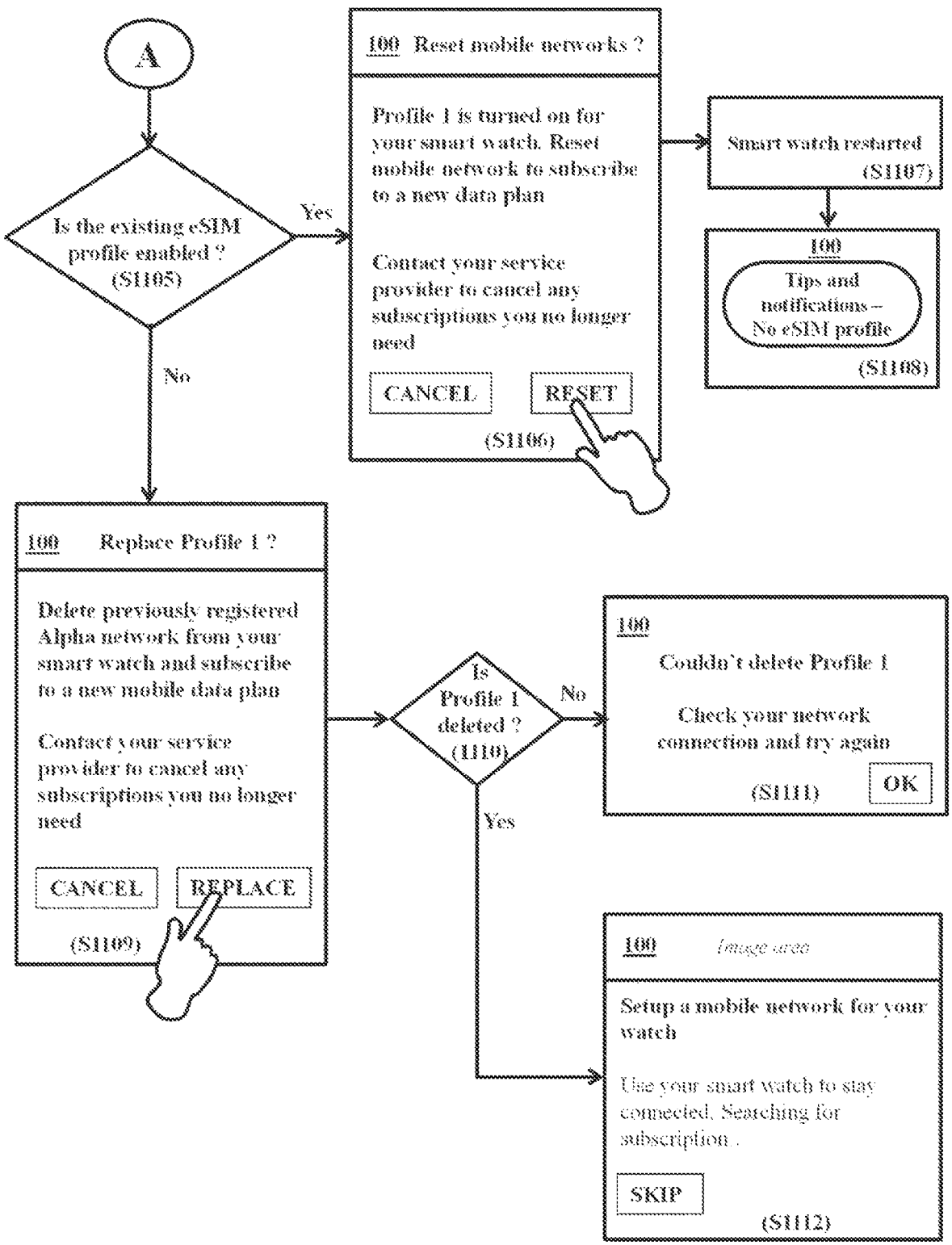

FIG. 11a and FIG. 11b illustrate an example scenario of performing customized RSP for a smart watch based on operator specific rules, according to an embodiment.

It is assumed that the smartphone 100 is paired to the smart watch 200. The smart watch 200 has eSIM profile "Profile 1", and the eSIM profile "Profile 1" is enabled by the smartphone 100 for the smart watch 200. However, such assumption may vary according to embodiments.

An MNO may not want to provide two eSIM profile of the same MNO to the smart watch 200, which may be recognized at the primary electronic device 100 based on the received MNO information.

In an example scenario, a mobile network for the smart watch 200 may be selected at S1101 for adding a new eSIM profile for the smart watch 200. In another example scenario, an option to setup another mobile network may be selected in the smartphone 100 at S1102 for adding a new eSIM profile for the smart watch 200. In both the example scenario, the smartphone 100 may determine whether an MNO of the new eSIM profile and an MNO of the existing eSIM profile (i.e. Profile 1) in the smart watch 200 are the same. At S1104, the smartphone 100 may perform general steps for downloading the new eSIM profile, when MNOs of the new eSIM profile and the existing eSIM profile in the smart watch 200 are different from each other.

The smartphone 100 may determine whether the existing eSIM profile is enabled for the smart watch 200, when the MNOs of the new eSIM profile and the existing eSIM profile in the smart watch 200 are the same. At S1106, the smartphone 100 may provide an option for accepting or rejecting the reset of the mobile network, when the existing eSIM profile is enabled for the smart watch 200. At S1107, the smartphone 100 may configure the smart watch 200 to restart, when the option to reset the mobile network is selected, and then, the smart watch 200 may reset the eSIM profiles, thus, at S1108, the smartphone 100 notify a user that currently no eSIM profile is not setup in the smart watch 200.

At S1109, the smartphone 100 may provide an option for replacing the existing eSIM profile in the smart watch 200, when the existing eSIM profile is disabled for the smart watch 200. At S1110, the smartphone 100 may determine whether the existing eSIM profile (i.e. Profile 1) can be deleted, when the option for replacing the existing eSIM profile is selected. At S1111, the smartphone 100 may notify the user that the existing eSIM profile is unable to be deleted, when the existing eSIM profile cannot be deleted. The smartphone 100 may configure the smart watch 200 to delete the existing eSIM profile, when the existing eSIM profile can be deleted, and then, the smart watch 200 may delete the existing eSIM profile. The smartphone 100 may notify user of the deletion of the existing eSIM profile and provide an option to setup a new mobile network for the smart watch 200.

Figure 12:
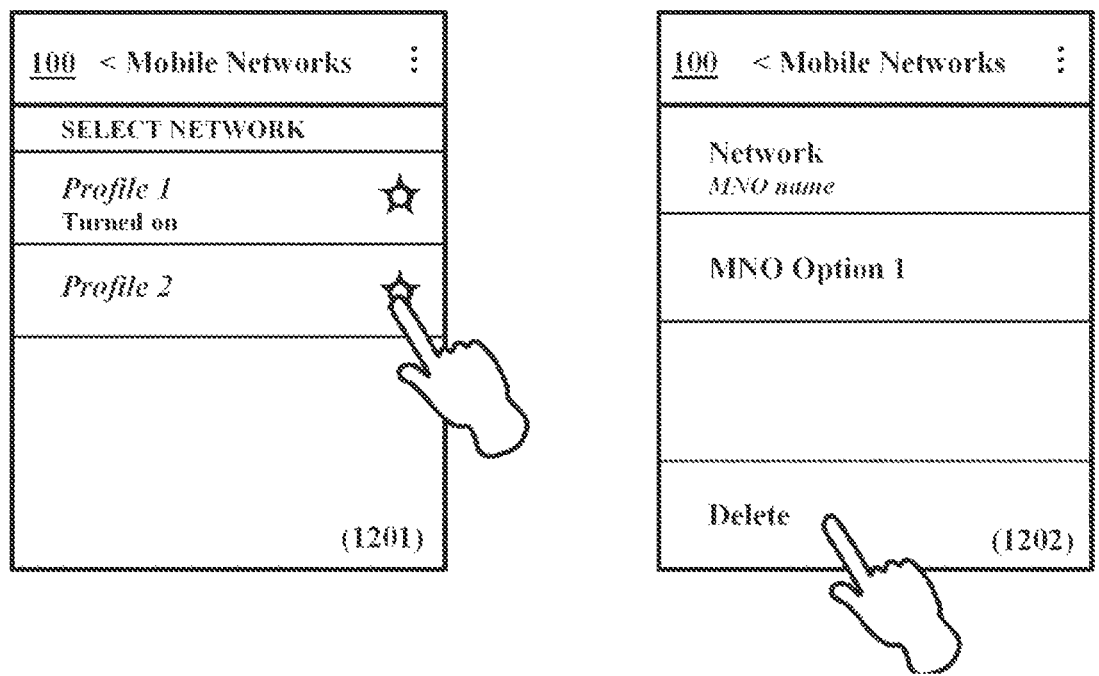
FIG. 12 illustrates an example scenario of deleting a disabled eSIM profile in a smart watch by a smartphone, according to an embodiment.

FIG. 12 illustrates an example scenario of deleting a disabled eSIM profile in a smart watch by a smartphone 100, according to an embodiment.

It is assumed that the smartphone 100 is paired to the smart watch 200. The smart watch 200 has two eSIM profiles, a first eSIM profile "Profile 1" is enabled by the smartphone 100 for the smart watch 200, and a second eSIM profile "Profile 2" is disabled for the smart watch 200. However, such assumption may vary according to embodiments.

At S1201, a settings option of the second eSIM profile "Profile-2" may be selected using the smartphone 100. At S1202, the smartphone 100 may provide an option for showing network details and a delete option to the user. When the delete option is selected the smartphone 100 may configure the smart watch 200 to delete the second eSIM profile.

According to an embodiment, the proposed method may allow the primary electronic device 100 to perform customized RSP for the secondary electronic device 200 based on the operator specific rules.

Figure 13:
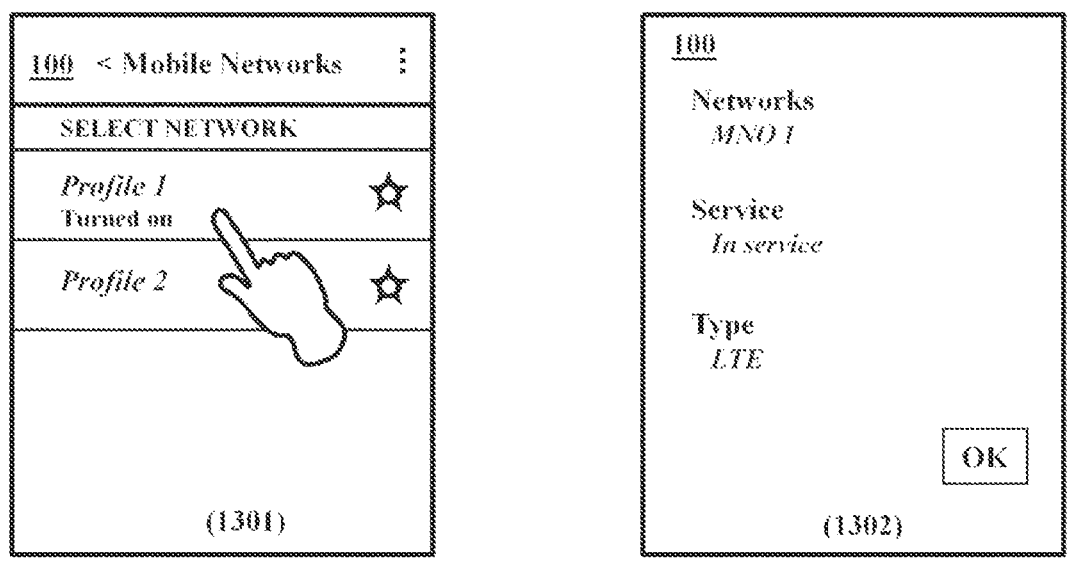
FIG. 13 illustrates an example scenario of providing additional details on an eSIM profile to a user by a smartphone, according to an embodiment.

FIG. 13 illustrates an example scenario of providing additional details on an eSIM profile to a user by a smartphone, according to an embodiment.

It is assumed that the smartphone 100 is paired to the smart watch 200. The smart watch 200 has two eSIM profiles, and a first eSIM profile "Profile 1" is enabled by the smartphone 100 for the smart watch 200. However, such assumption may vary according to embodiments.

At S1301, a name of the first eSIM profile may be selected using the smartphone 100. At S1302, the smartphone 100 may provide the network details including a MNO name, an operation state of a cellular service and a type of cellular network.

Figure 14:
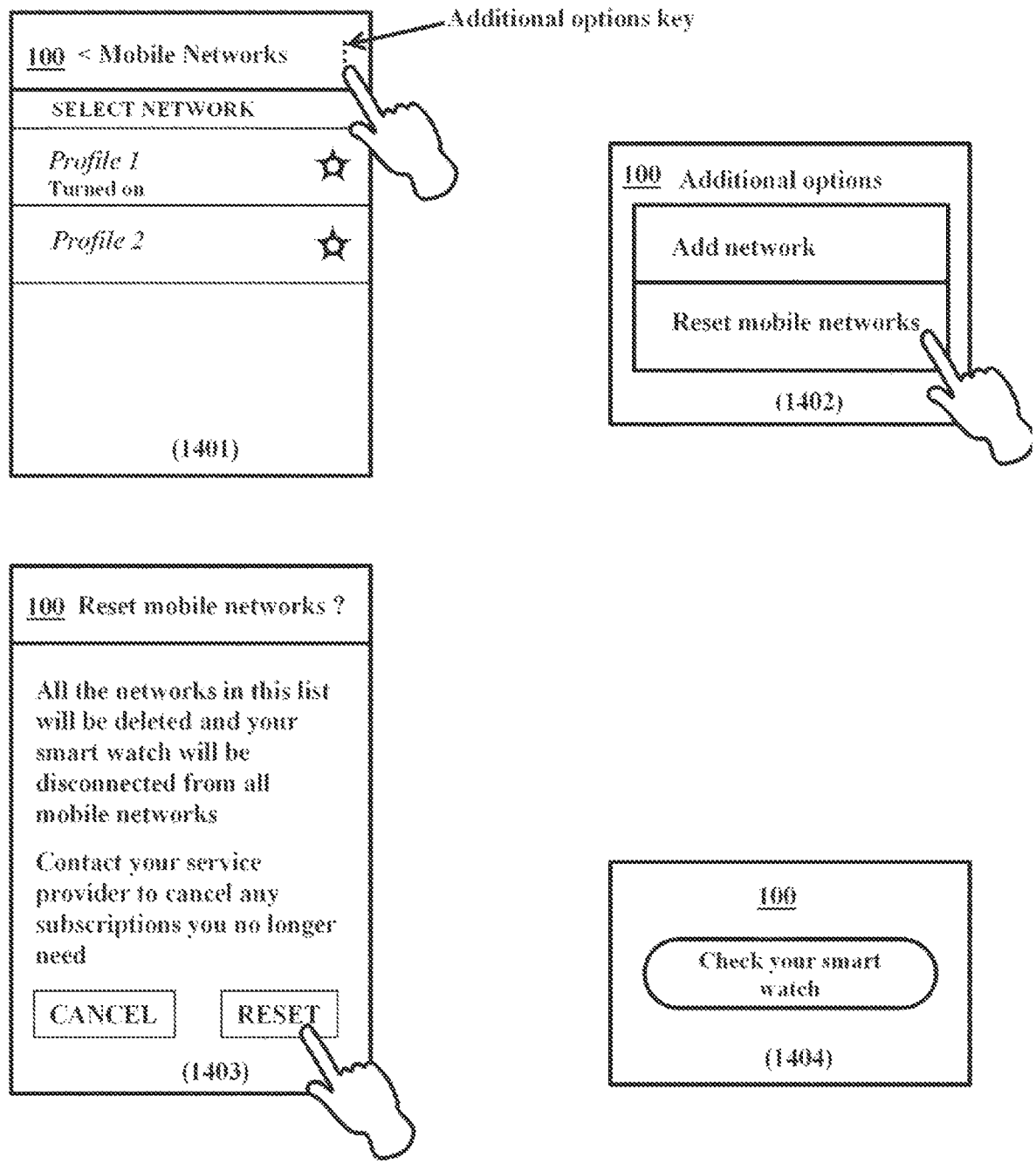
FIG. 14 illustrates an example scenario of providing additional options on a mobile network to a user by a smartphone, according to an embodiment.

FIG. 14 illustrates an example scenario of providing additional options on a mobile network to a user by a smartphone, according to an embodiment.

It is assumed that the smartphone 100 is paired to the smart watch 200. The smart watch 200 has two eSIM profiles, and a first eSIM profile "Profile 1" is enabled by the smartphone 100 for the smart watch 200. However, such assumption may vary according to embodiments.

At S1401, an additional options key for the mobile network may be selected in the smartphone 100. At S1402, the smartphone 100 may provide the additional options including an option to add an add network and an option to reset a mobile network in the smart watch 200. When the option to reset is selected, the smartphone 100 may request to a user to confirm the reset of the mobile network for the smart watch 200. The smartphone 100 may delete all mobile networks accessible at the smart watch 200 and configure the smart watch 200 to disconnect from all mobile networks, in response to confirming the reset of the mobile network by the user. The smartphone 100 may display a notification for checking the smart watch 200 at S1404.

Figure 15:
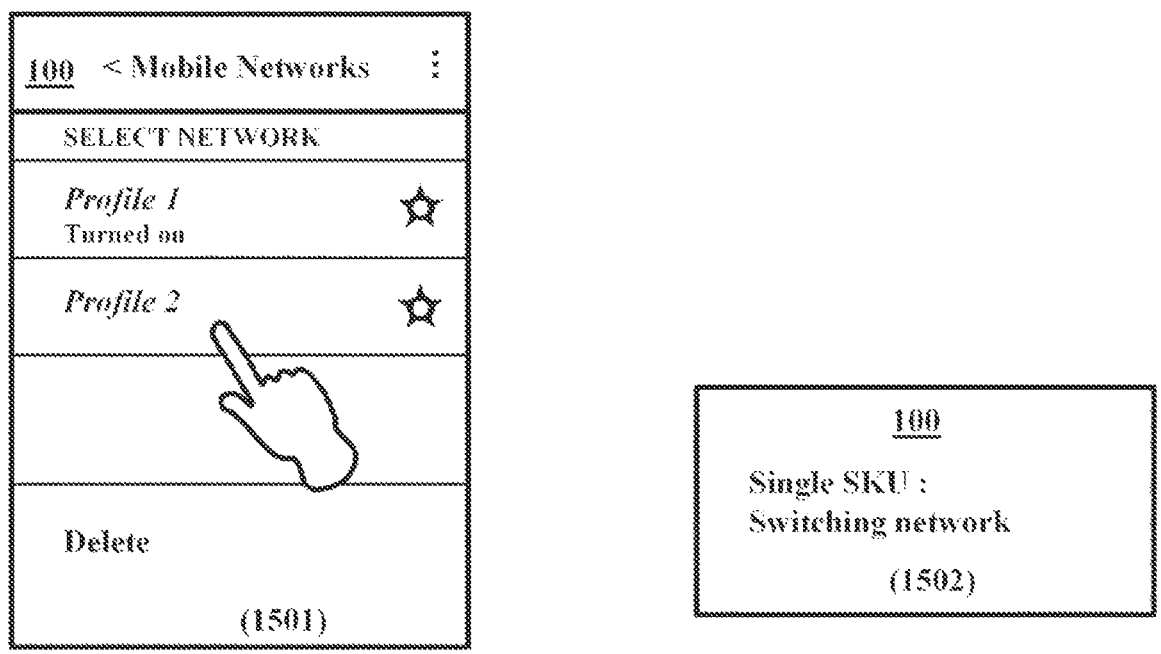
FIG. 15 illustrates an example scenario of switching a mobile network by a smartphone, according to an embodiment.

FIG. 15 illustrates an example scenario of switching a mobile network by a smartphone, according to an embodiment.

It is assumed that the smartphone 100 is paired to the smart watch 200. The smart watch 200 has two eSIM profiles, and a first eSIM profile "Profile 1" is enabled by the smartphone 100 for the smart watch 200. However, such assumption may vary according to embodiments.

At S1501, a second eSIM profile "Profile-2" may be selected using the smartphone 100, to enable the second eSIM profile for the smart watch 200. At S1502, the smartphone 100 may notify the user that the mobile network of the smart watch 200 is switching to a mobile network corresponds to the second eSIM profile.

Figure 16:
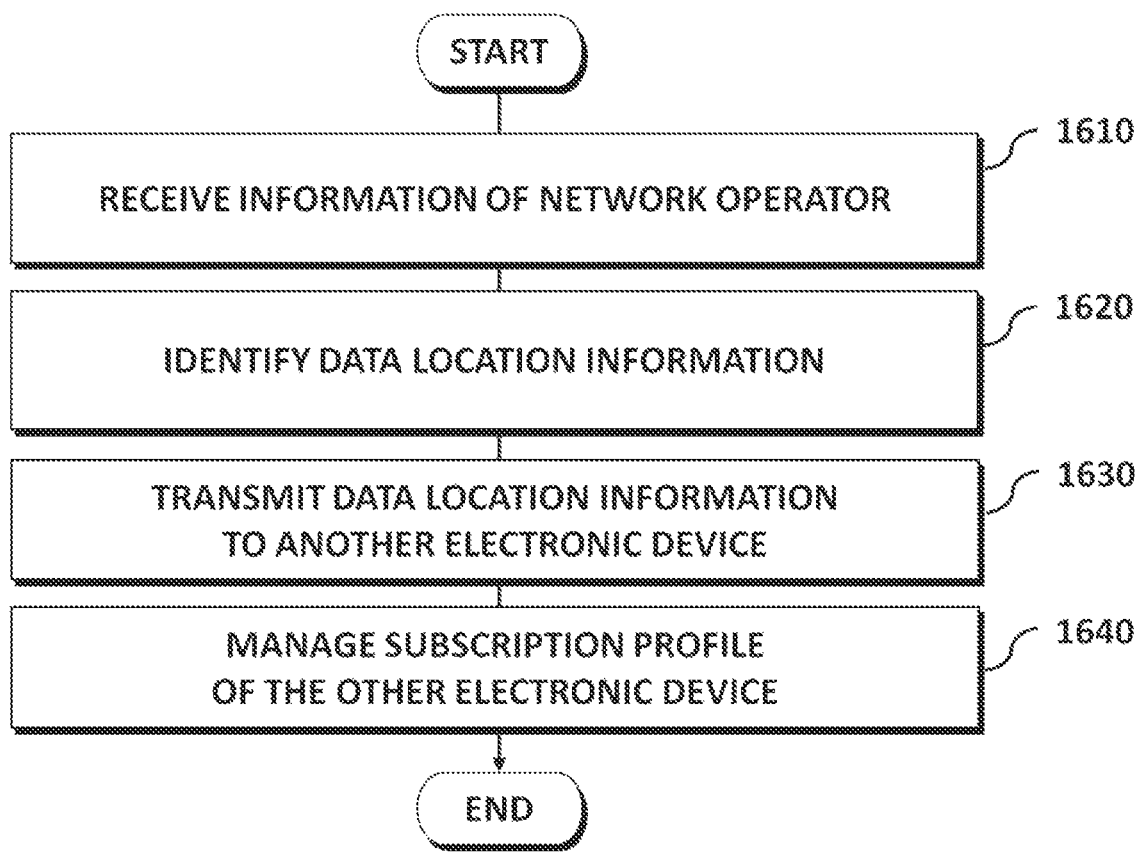
FIG. 16 is a flowchart of a method according to an embodiment.

FIG. 16 is a flowchart of a method according to an embodiment.

The method of FIG. 16 may be performed at the primary electronic device 100 described above, but is not limited thereto. For example, the method may be performed at the primary electronic device 100 and the secondary electronic device 200. According to an embodiment, a subscription profile of the secondary electronic device 200 may be managed at the primary electronic device 100.

At 1610, information of a network operator may be received at an electronic device, such as the primary electronic device 100. The information of the network operator may include the MNO information, but is not limited thereto. The information of the network operator may be received from the cloud server 2000. The cloud server 2000 may be operated by a manufacture of the primary electronic device 100 and/or the secondary electronic device 200.

In an embodiment, the information of the network operator may include information regarding means for the activating of the subscription profile at the secondary electronic device. In an embodiment, the information of the network operator may include information regarding policies of the network operator.

The primary electronic device 100 may identify means for activating the subscription profile based on the information of the network operator. The means for activating the subscription profile may vary according to network operators. Various means for activation are explained above, thus, redundant explanation is avoided.

The primary electronic device 100 may display a user interface to select means for activating the subscription profile.

In an embodiment, the primary electronic device 100 may receive the data location information from a server operated by the network operator.

At 1620, data location information may be identified based on the information of the network operator. The data location information may be the SMDP address is not limited thereto. The data location information may be used to communicate with the SMDP server 4000 for activating a subscription profile. The SMDP server 4000 may be operated by the network operator. The subscription profile may include an embedded subscriber identity module (eSIM) profile, but is not limited thereto.

At 1630, the data location information may be transmitted to another electronic device, such as the secondary electronic device 200.

The data location information may be used at the secondary electronic device 200 for activating the subscription profile. In an embodiment, the secondary electronic device 200 may download the subscription profile from the SMDP server 4000 by using the data location information.

At 1640, the subscription profile of the other electronic device is manageable based on a user input. Various ways of managing the subscription profile of the other electronic device is explained by referring to FIGS. 7 through 15, thus, redundant explanation is avoided.

The various actions, acts, blocks, steps, or the like in the flowchart may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein may be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An electronic device comprising:
a memory storing instructions; and
at least one processor configured to execute the instructions to:
receive information of a network operator from at least one server, wherein the information of the network operator comprises information regarding activating a subscription profile at another electronic device;
in response to identifying based on the information of the network operator that the network operator provides the information regarding activating the subscription profile at the other electronic device, display a user interface for activating the subscription profile at the other electronic device;
identify data location information based on the information of the network operator;
transmit the data location information to the other electronic device for activating a subscription profile at the other electronic device to use a network provided by the network operator; and
manage the subscription profile of the other electronic device at the electronic device based on a user input.

2. The electronic device of claim 1, wherein the subscription profile comprises an embedded subscriber identity module (eSIM) profile.

3. The electronic device of claim 1, wherein the information of the network operator comprises information regarding policies of the network operator.

4. The electronic device of claim 1, wherein the at least one processor is further configured to execute the instructions to:
in response to identifying based on the information of the network operator that the information regarding activating the subscription profile is not available, receive the data location information using the information of the network operator from a server operated by the network operator.

5. The electronic device of claim 1, wherein the user interface for activating the subscription profile at the other electronic device comprises at least one of offline activation, on device activation (ODA), or quick response (QR) code activation.

6. The electronic device of claim 1, wherein the electronic device is registered to a push server to receive a push message related to activating the subscription profile at the other electronic device.

7. The electronic device of claim 1, wherein the at least one processor is further configured to execute the instructions to:
transmit to the at least one server a request for managing the subscription profile of the other electronic device; and
receive a response from the at least one server, wherein the response indicates an activation process of the subscription profile at the other electronic device.

8. The electronic device of claim 1, wherein the electronic device is a primary electronic device of a user, and the other electronic device is a secondary electronic device of the user.

9. The electronic device of claim 1, wherein the electronic device shares, with the other electronic device, one phone number for receiving an incoming call through the network provided by the network operator.

10. The electronic device of claim 1, wherein the at least one processor is further configured to execute the instructions to:
set up the subscription profile of the other electronic device at the electronic device based on a user input.

11. The electronic device of claim 1, wherein the at least one processor is further configured to execute the instructions to:
reset the subscription profile of the other electronic device at the electronic device based on a user input.

12. The electronic device of claim 1, wherein the at least one server is a cloud server, and the at least one processor is further configured to execute the instructions to:
transmit to a server, different from the cloud server, a request for managing the subscription profile of the other electronic device; and
receive a response from the server, wherein the response indicates an activation process of the subscription profile at the other electronic device.

13. The electronic device of claim 1, wherein the at least one server is a cloud server, and the data location information comprises an address to communicate with a server, different from the cloud server, for activating the subscription profile.

14. The electronic device of claim 13, wherein the data location information is used to obtain, from the server, the subscription profile for the other electronic device.

15. A method comprising:
    receiving, by an electronic device, information of a network operator from at least one server, wherein the information of the network operator comprises information regarding activating a subscription profile at another electronic device;
    in response to identifying, based on the information of the network operator, that the network provides the information regarding activating the subscription profile at the other electronic device, displaying a user interface for activating the subscription profile at the other electronic device;
    identifying, by the electronic device, data location information based on the information of the network operator;
    transmitting, by the electronic device, the data location information to the other electronic device for activating a subscription profile at the other electronic device to use a network provided by the network operator; and
    managing the subscription profile of the other electronic device at the electronic device based on a user input.

16. A non-transitory computer readable medium comprising instructions that, when executed by at least one processor of an electronic device, which cause the at least one processor to carry out the method of claim 15.

17. A non-transitory computer readable medium comprising instructions that, when executed by at least one processor of an electronic device, cause the at least one processor to:
    receive, from another electronic device, data location information for activating a subscription profile;
    receive, based on the data location information, the subscription profile from a network operator; and
    activate the subscription profile at the electronic device to use a network provided by the network operator, wherein the subscription profile of the electronic device is manageable at the other electronic device.

* * * * *